United States Patent
Gibbons

(10) Patent No.: US 11,445,773 B2
(45) Date of Patent: Sep. 20, 2022

(54) MULTI-USE COVER

(71) Applicant: The Boppy Company, LLC, Golden, CO (US)

(72) Inventor: Haley Gibbons, Westminster, CO (US)

(73) Assignee: The Boppy Company, LLC, Golden, CO (US)

(*) Notice: Subject to any disclaimer, the term of this patent is extended or adjusted under 35 U.S.C. 154(b) by 443 days.

(21) Appl. No.: 16/572,372

(22) Filed: Sep. 16, 2019

(65) Prior Publication Data

US 2020/0121007 A1    Apr. 23, 2020

Related U.S. Application Data

(60) Provisional application No. 62/746,976, filed on Oct. 17, 2018.

(51) Int. Cl.
| | | |
|---|---|---|
| *A41D 15/04* | (2006.01) | |
| *B62B 9/14* | (2006.01) | |
| *A41D 1/215* | (2018.01) | |

(52) U.S. Cl.
CPC ............ *A41D 15/04* (2013.01); *A41D 1/215* (2018.01); *B62B 9/142* (2013.01)

(58) Field of Classification Search
CPC .......... A41D 15/04; A41D 1/215; A41D 3/08; B62B 9/142
USPC .......................................................... 2/104
See application file for complete search history.

(56) References Cited

U.S. PATENT DOCUMENTS

| | | | |
|---|---|---|---|
| 5,652,960 A * | 8/1997 | Kaknevicius | A41D 1/215 2/104 |
| 10,264,832 B2 | 4/2019 | Gibbons | |
| 2014/0007315 A1* | 1/2014 | Toro-Gerstein | A41D 1/215 2/104 |
| 2016/0227847 A1* | 8/2016 | Gibbons | A41D 3/08 |
| 2018/0007980 A1* | 1/2018 | Butler | A41D 1/215 |
| 2018/0228301 A1* | 8/2018 | Winfield Kmiec | A47D 15/00 |
| 2020/0121007 A1* | 4/2020 | Gibbons | A41D 1/215 |

FOREIGN PATENT DOCUMENTS

BR    202012019235    5/2014

OTHER PUBLICATIONS

PCT/US2019/052389, "International Search Report and Written Opinion", dated Oct. 30, 2019, 10 pages.

* cited by examiner

*Primary Examiner* — Gloria M Hale
(74) *Attorney, Agent, or Firm* — Kilpatrick Townsend & Stockton LLP

(57) ABSTRACT

A configurable baby cover for covering an infant in a number of situations and/or environments. A fabric portion provides privacy or shade for the infant and is shaped to ensure coverage of a user while nursing. A mesh portion provides airflow to the user and baby to prevent overheating and completes the shape of the cover. The cover has a first opening and a second opening which define a passage through the cover through which a user's torso, a baby car seat, a high chair, or other object may pass through partially or wholly. Fasteners around the second opening of the cover reduce the size of the second opening when secured and keep the cover in place on a user's shoulder or on an upper portion of a car seat or high chair.

20 Claims, 10 Drawing Sheets

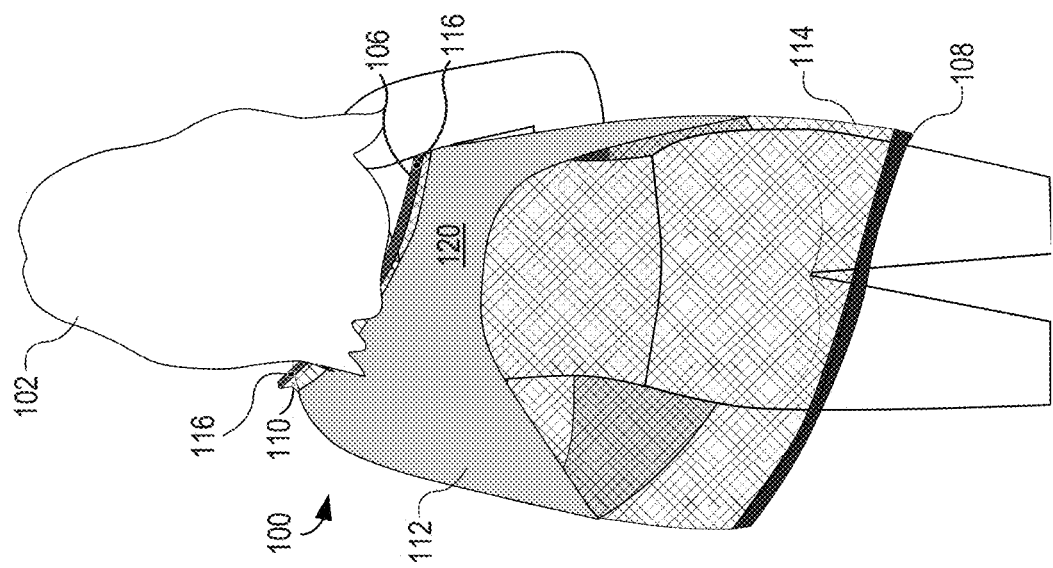
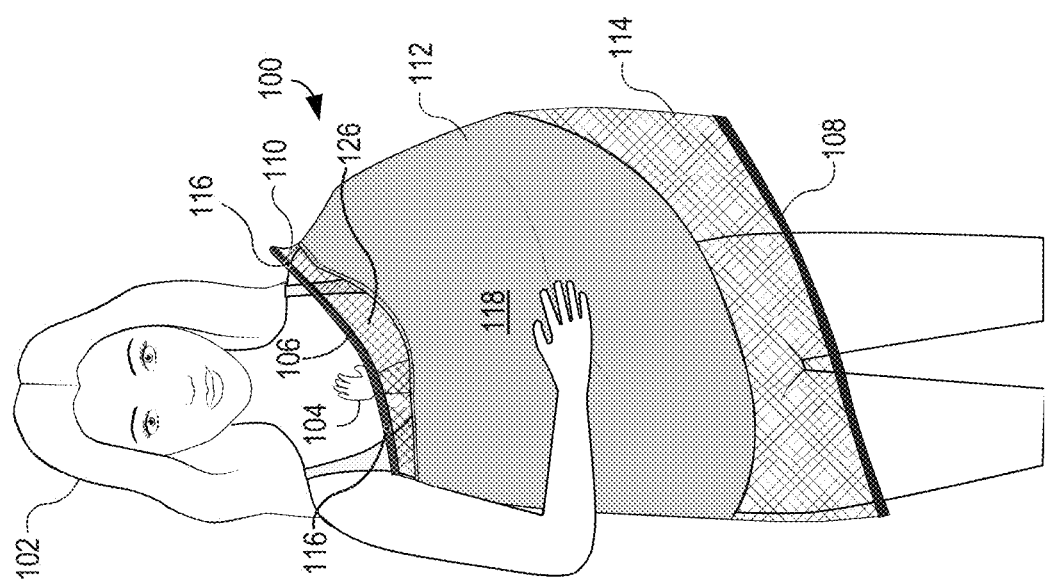

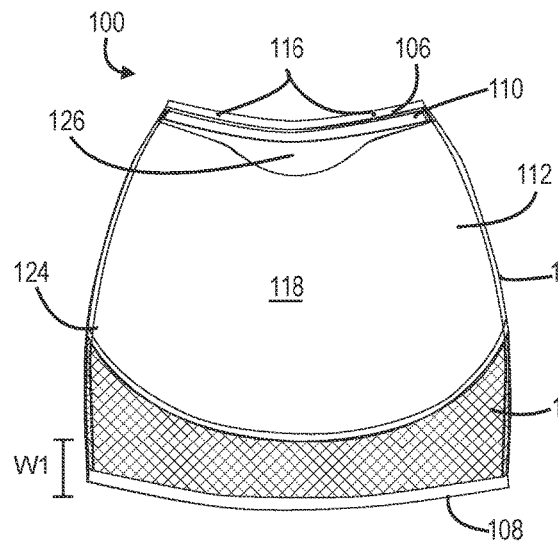 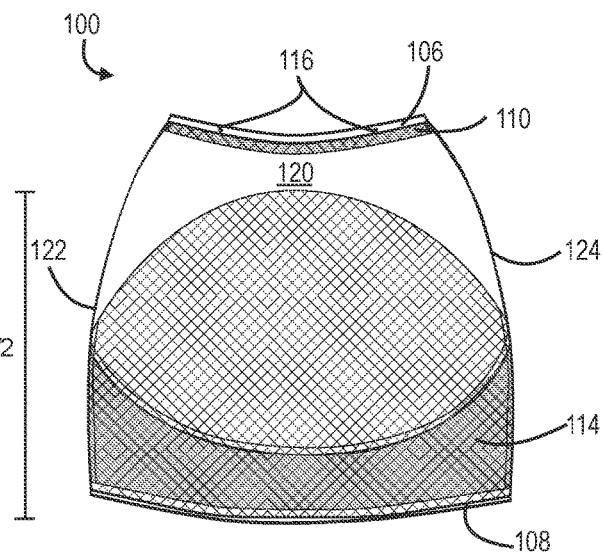
FIG. 2A  FIG. 2B
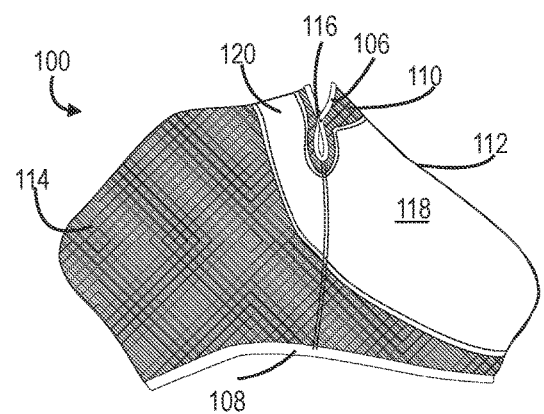 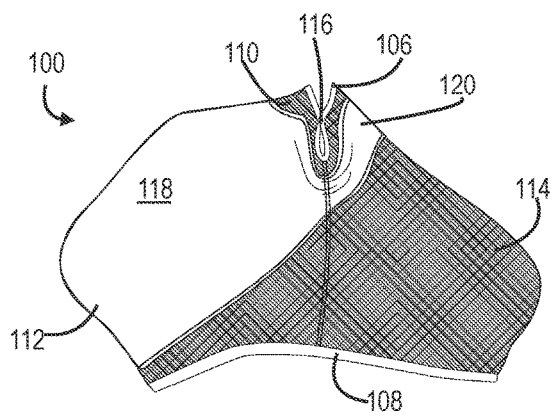
FIG. 3  FIG. 4

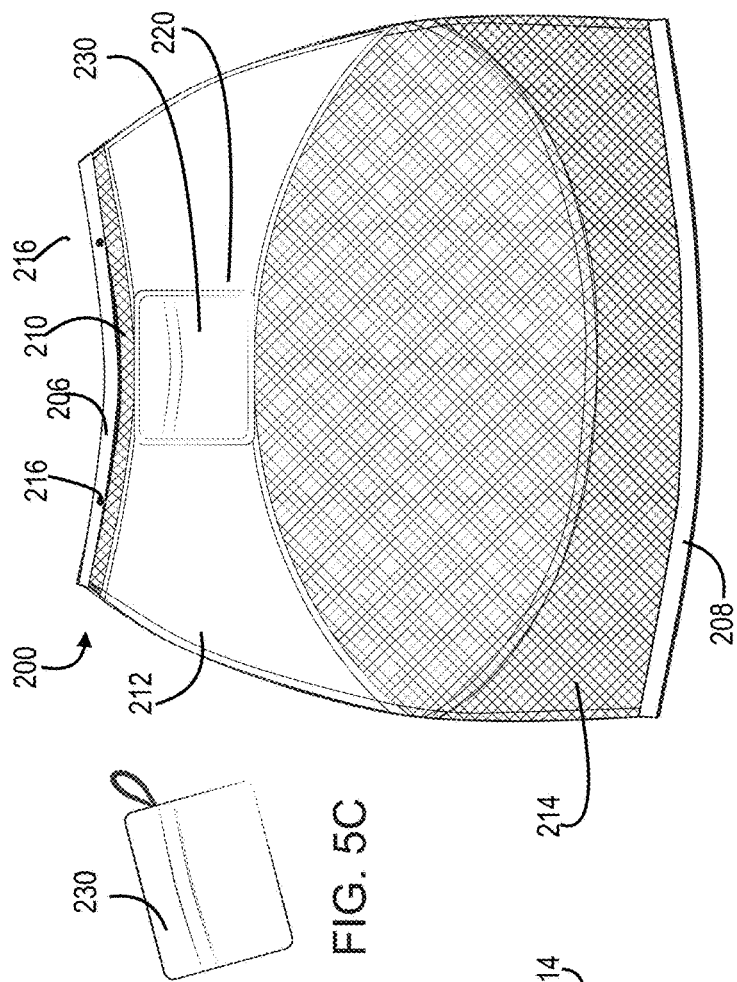
FIG. 5B
FIG. 5C
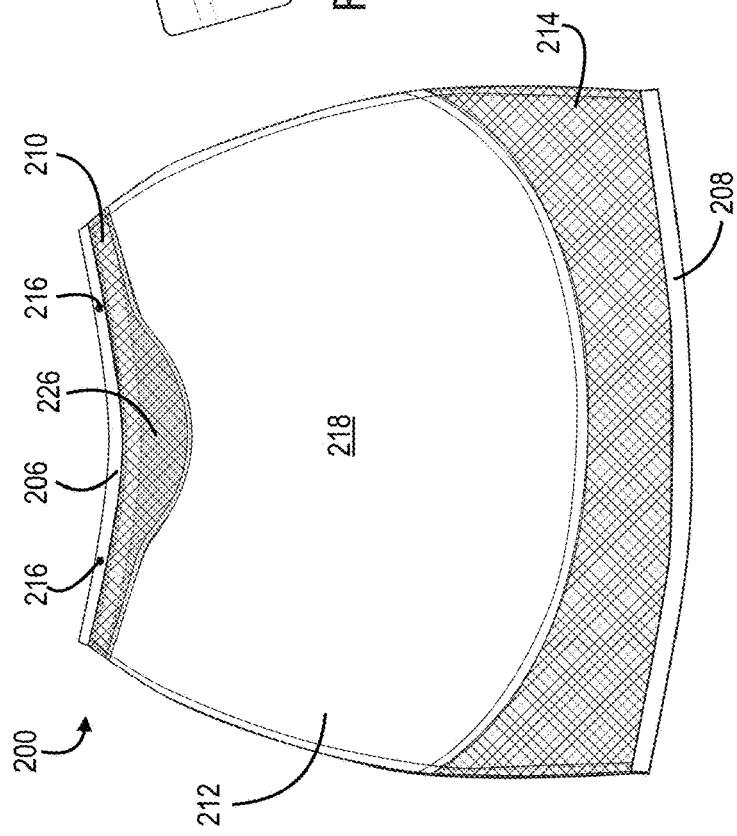
FIG. 5A

MULTI-USE COVER

CROSS-REFERENCE TO RELATED APPLICATIONS

This application claims priority to U.S. Provisional Patent Application No. 62/746,976, filed Oct. 17, 2018, the disclosure of which is incorporated by reference herein in its entirety.

FIELD OF THE INVENTION

The disclosure generally relates to baby covers.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Babies and very young children are often covered while sleeping or nursing by various different styles of covers. Nursing covers allow a user to nurse a baby in public or in private and remain covered. Some nursing covers have an excessive number of straps, snaps, or other closures which can be difficult to manage and orient when attempting to nurse a baby. Some nursing covers can cause a user to become excessively hot and prevent airflow, ultimately contributing to overheating. Baby car seat covers allow a baby to be shielded from intrusive noises, lights, or other disturbances when they are sleeping or preparing to sleep. Chair covers rest on the seat of a chair or other surface and serve as a barrier between a person and any germs, bacteria, or other foreign matter that may be on the surface of the seat. Baby car seat covers and chair covers are often made of fabric and drape over the chair or baby car seat to provide a comfortable environment for sleeping or resting. Covers often reduce airflow to the user and the baby and can cause excessive heat to build up resulting in overheating for the user and the baby. Many users end up carrying around or using several different covers for different chairs, baby car seats, or nursing. Each additional cover comes at additional cost and is also a burden that must be carried, even when not in use just to have available for future use.

SUMMARY OF THE INVENTION

The embodiments discussed below include a multi-use cover capable of covering a car seat, stroller, or chair in addition to serving as a scarf or nursing cover. The cover is made from fabric and includes a solid fabric portion and a mesh portion. The fabric of the cover is flexible and stretches to conform to the shape of any object it is placed on. The cover forms a loop of having a given width which may vary and the loop has a diameter sufficient to allow a user to wear the cover doubled over as a scarf. A user may also wear the cover around their neck as a single loop, not doubled over, also as a scarf. The cover may also be worn so the fabric or material extends over and past the shoulders of a wearer and fits similar to a poncho, or under arms like a strapless top, or under one arm like a toga. In yet another configuration of the same embodiment, the cover may be stretched over a chair or baby car seat to shield or block a child's view or to keep out unwanted light or noise. In several embodiments, when the cover is stretched over a high chair or other seat the child is shielded or protected from germs or other disturbances or annoyances.

In some embodiments, the cover has snaps or closures which allow the user to reduce the circumference of one or more openings of the cover. In some additional embodiments, the closures around a top opening may secure to the closures around a bottom opening to reduce the length or height of the cover and keep it in a torus shape. In this configuration, the cover is easily worn as a scarf. In a separate configuration of the same embodiment, the snaps or closures may be closed to constrict one end of the cover so the fabric may drape down a wearer's body to serve as a poncho-style garment or as a nursing cover. In this configuration, the snaps may also be open with the cover resting on one or both shoulders of the wearer to hold it in place, or may not be on the shoulders at all. In yet another configuration of the same embodiment, the cover may be pulled partially over a car seat, such that one open end of the loop passes over the car seat while the other open end of the loop remains above the car seat, supported by the handle of the car seat. In other words, the car seat passes partway through the opening of the loop, with the handle of the car seat in an upright position supporting the top or upper portion of the cover to cause the cover to create a barrier over the car seat.

In some embodiments, the cover may be pulled over a seating area of a chair or a high chair to provide a seat cover on which a child sits. In this configuration, the cover provides a barrier between the child and a high chair or seat, such as at a restaurant, that keeps unknown germs, bacteria, or other foreign matter out of contact with the child. The multi-use cover may be opened such that it forms a passageway from the top opening to the bottom opening, with the bottom opening lowered over the chair and the top opening closed or reduced in circumference by the closures to keep the multi-use cover over the seat of the high chair. In this configuration, the snaps or closures of the top opening may create one or more leg holes for the legs and feet of a child who sits in the high chair.

In any embodiment of the disclosure, the cover may be made of one or more types of material, such as a stretchable fabric, a mesh fabric, or any other suitable fabric. In some embodiments the cover may have a first side made of an opaque fabric while a second side is made of a mesh or open weave fabric. The open-weave or mesh portion of such an embodiment may allow for air flow and circulation to keep a baby cool and prevent overheating while still covering to protect from light and noise. Additionally, the open-weave or mesh portion of the cover allows for air circulation or flow to help keep a nursing user 102 cool while covered.

One general aspect includes a configurable cover for a baby, including: a cover body having a first fabric portion defining a first opening and a second fabric portion defining a second opening with a conduit between the first opening and the second opening through the configurable cover. The cover body tapers from the first opening to the second opening. The first fabric portion includes an opaque material and the second fabric portion includes a mesh material.

Another general aspect includes a convertible cover, including a first portion comprising a first mesh fabric and defining a first opening to an interior of the convertible cover and a second portion including a second mesh fabric and defining a second opening to the interior. The convertible cover also includes a third portion including a fabric and connecting the first portion and the second portion together to form a body having a passage from the first opening to the second opening. The convertible cover also includes a releasable closure positioned at a perimeter of the first opening to releasably couple to reduce a diameter of the first opening.

Yet another general aspect includes a convertible cover having a cover body including a first portion including a first mesh fabric and defining a first opening to an interior of the convertible cover and a second portion including a second mesh fabric and defining a second opening to the interior. The convertible cover also includes a third portion including a fabric and connecting the first portion and the second portion together to form a body having a passage from the first opening to the second opening. On a first lateral side of the cover body the second portion has a first width and on a second lateral side of the cover body the second portion has a second width, the second width greater than the first width. The convertible cover also includes a releasable closure positioned at a perimeter of the first opening to releasably couple to reduce a diameter of the first opening. The cover body tapers from a first dimension at the first opening to a second dimension at the second opening, the second dimension greater than the first dimension.

BRIEF DESCRIPTION OF THE DRAWINGS

Various features, aspects, and advantages of the present invention will be better understood when the following detailed description is read with reference to the accompanying figures in which like characters represent like parts throughout the figures, wherein:

FIGS. 1A-1B depict a front and a back side of a multi-use cover in a nursing cover configuration on a user, according to at least one example.

FIGS. 2A-2B depict a front and a back side of a multi-use cover in a flat configuration, according to at least one example.

FIG. 3 depicts a multi-use cover in a baby car seat cover configuration with an infant covered for privacy, according to at least one example.

FIG. 4 depicts a multi-use cover in a baby car seat cover configuration with an infant visible through a mesh, according to at least one example.

FIGS. 5A-5C depict a front side, a back side, and a stored configuration of a multi-use cover with a built-in storage pouch, according to at least one example.

DETAILED DESCRIPTION OF THE INVENTION

Figure 6:
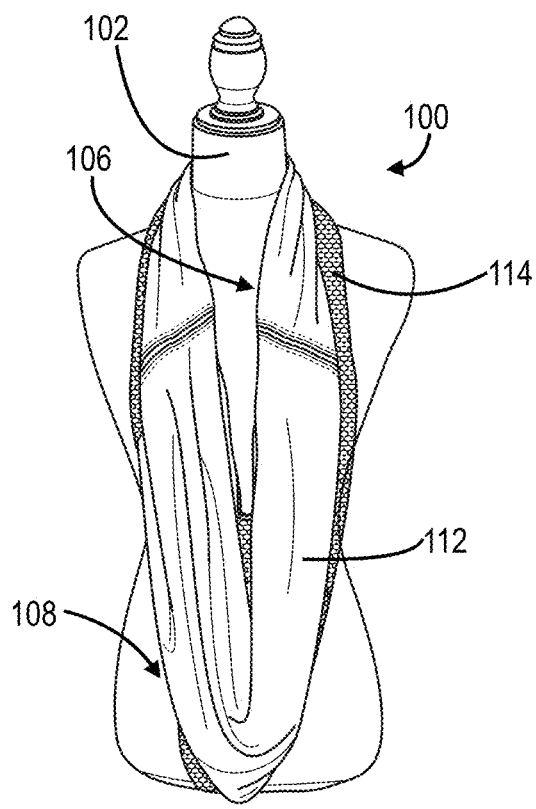
FIG. 6 depicts a multi-use cover shown worn as a scarf with a single wrap, according to at least one example.

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The discussion below describes embodiments of a multi-use cover for a baby that is easy to use and convert between uses. The term baby is understood to mean a child up to approximately three years of age and weighing up to approximately thirty-five pounds. The multi-use cover includes a fabric portion sewn or otherwise attached to form a continuous loop having a particular diameter and the fabric forming the loop having a particular width. The fabric may actually be made of several different types of fabric having different properties with respect to stretch, airflow, appearance, weight, or other factors. On one side of the loop, there are fasteners to constrict or otherwise reduce the diameter of the size of the loop on that side. The multi-use cover may be stretched over a car seat to create a tent-like area supported by an upright handle of the car seat.

The cover may also stretch over a high chair by opening one end of the loop and lowering it over the chair before releasing the stretched or opened end to secure it over the chair, with the second end or the second opening of the loop of fabric still above or at least partly above the chair. In this configuration of the multi-use cover, the cover serves as a removable seat cover for a high chair to keep germs, bacteria, or other foreign matter that may be on the high chair from contacting the baby. In some embodiments, when the multi-use cover is pulled over a high chair as described above, the closures or snaps around the top opening may be engaged or partially engaged to create one or more leg openings for the baby's legs while seated.

In another configuration, one or more of the fasteners is secured to reduce the opening on one end of the loop and the cover is pulled over the torso of a user 102, resting the constricted opening on at least one shoulder of the user 102 and allowing the fabric to cover at least a portion of the torso of the user 102 for nursing or other uses. In yet another configuration, the multi-use cover may be worn as a scarf around the neck of a user 102 for easy carrying and transportation when not in use. The loop may be draped around the neck of the user 102 once or twice in a doubled over configuration. Other uses are contemplated and intended for the cover, such as an article of clothing similar to a poncho or loose-fitting sweater.

Turning now to the figures, FIGS. 1A-1B show two views, a front view (FIG. 1A) and a back view (FIG. 1B), of a multi-use cover 100 worn by a user 102 to cover a baby 104. As illustrated, the multi-use cover 100 is in a nursing cover configuration, one of several available configurations for the multi-use cover 100. The multi-use cover 100 features two or more different material types to form a fabric band. A first portion 110 of the multi-use cover 100 is formed from a first material, a second portion 114 is also formed of the first material, and a third portion 112 is formed of a second material. The first material has an open weave or knit pattern or may be a mesh material that allows air to easily pass through and is also transparent, or at least allows a user 102 to see through the first material. The open weave or mesh material allows air flow for the user 102 to reduce heat and sweating for the user 102. The first portion 110 and the second portion 114 are designed to provide structure to the multi-use cover 100 but not to cause the user 102 or the baby 104 to overhead. For example, the second portion 114 includes a large or wide portion shown in FIG. 1B configured to cover the back of the user 102 when being used as a nursing cover, allowing free air movement across the back of the user 102. There may also be other mesh portions, such as the first portion 110, located at the upper end of the multi-use cover 100 which allow additional air flow for a nursing baby 104 and also provides the user 102 with visibility under the cover without allowing visibility for a third party.

The second material forming the third portion 112 is an opaque material, or a material that provides coverage and serves as a nursing cover by being non-transparent. The second material may be a stretchy material such as a jersey knit fabric or other material having a stretchy quality for comfort. The third portion 112 formed of the second material includes a cover portion 118 that is shaped to provide coverage for a nursing baby and user 102 and has curved edges that allows and ensures full coverage when viewed from a front or a side angle. Furthermore, the third portion 112 may include a narrow band 120 which traverses the back of the user 102 as shown in FIG. 1B which serves to connect left and right sides of the cover portion 118 into a continuous band of fabric.

The first portion 110 defines a first opening 106 through which the head, neck, and shoulder of the user 102 may pass. The second portion 114 also defines a second opening 108 with the first portion 110, second portion 114, and third portion 112 forming a passageway connecting the first opening 106 with the second opening 108.

At one or both of the first opening 106 and the second opening 108 there may be an additional band of material, either of a similar material used on the cover or of a separate material, designed to add weight to the edge of the multi-use cover 100, which ensures that the multi-use cover 100 remains draped over the body of the user 102 and doesn't flap upwards or move the bottom edge or second opening 108 of the cover upwards when the user 102 is moving or sitting.

Another feature of the multi-use cover 100, is a single, or series of fasteners 116 around a perimeter of at least one of the first opening 106 or the second opening 108. As shown in FIGS. 1A-1B, the fastener 116 may be a snap or button, but other fasteners are suitable, so long as they allow portions of the edge to be connected, thereby reducing the diameter of the opening of the multi-use cover 100 at that edge. The fasteners 116 are each shown as one-half of a releasable connection, such as a snap described above, such that combining a first fastener 116 with a second fastener 116 reduces the size of the first opening 106. By reducing the diameter of the first opening 106, the multi-use cover 100 may rest on one shoulder, or both shoulders of the user 102 to prevent the cover from sliding down past the shoulders of the user 102 and uncovering the baby 104. In some configurations, the multi-use cover 100 may have a cylindrical shape, with the fasteners 116 allowing a user to configure the cover into a conical or frustum shape. In other configurations, the cover may have a conical or dome-like shape, or otherwise taper from the first opening 106 to the larger second opening 108.

FIGS. 2A-2B shows the multi-use cover 100 in a flat configuration, such as when it is laid on a flat surface and not in use as a cover. As described above, the multi-use cover 100 may have a tapered shape, as defined by the left edge 124 and the right edge 122. The left edge 124 and the right edge 122 are each curved from the smaller first opening 106 to the larger second opening 108. In some instances, the left edge 124 and the right edge 122 may have other curved profiles or straight profiles in the case of a cylindrical on conically shaped multi-use cover 100.

The first portion 110 includes a wider portion 126 that coincides with the cover portion 118 of the third portion 112. This wider portion 126 is made of the mesh material and provides the private view of the baby 104 by the user 102 through the mesh fabric as well as providing airflow through the multi-use cover 100 to prevent the baby 104 and the user 102 from getting excessively warm. The first portion 110 may have a width of around one inch around the entire circumference of the multi-use cover 100, with the exception of the wider portion 126 which may increase to a range of three to four inches. The one inch width of the first portion 110 allows airflow while still providing coverage to the user 102. The wider portion 126 having a maximum width in the range of three to four inches allows the mesh fabric of the first portion 110 to provide airflow and view of the baby 104 for the user 102 while the user 102 is covered and provided with privacy while nursing.

The second portion 114 has a wide portion having a first width W1 and a narrow portion having a second width W2, the narrow portion on the same side as the wider portion 126 of the first portion. This same side includes the cover portion 118 of the third portion 112. At the narrow portion, the width of the mesh fabric making up the second portion may be in a range of three to five inches and gradually taper or increase to a width at the wide portion of fifteen to sixteen inches. The large portion of mesh fabric of the second portion on the opposite side of the cover portion 118 provides airflow to the user 102 and has additional functionality as a shade or shield against bugs when used over a car seat as described below. As such, the mesh fabric of the second portion 114 is important to have the gradual curving shape to provide the cover portion 118 to sufficiently cover a user 102 while also providing airflow and shape necessary to cover the car seat.

The third portion 112, including the second material which is non-transparent or opaque fabric portion of the cover may have a curved shape to form the cover 118 as shown to ensure coverage of the baby 104 while allowing for maximum airflow and cooling for a user 102 through the mesh fabric of the first portion 110 and the second portion 114. The edge bands along the top and bottom edge at the perimeter of the first opening 106 and the second opening 108 of the multi-use cover 100 are shown in FIG. 2 as well, with optional fasteners 116 as described above. The third portion 112 at the cover portion 118 may have a width in a range of twelve to fourteen inches and taper or gradually change to a width of around six inches at the opposite side of the multi-use cover 100 from the cover portion 118. This width allows the multi-use cover 100 to provide appropriate coverage while nursing while still permitting a user 102 to view the baby 104 and providing airflow through the multi-use cover 100.

FIG. 3 is a view of the multi-use cover 100 in a first orientation covering a baby car seat. In this orientation, the third portion 112, including the cover portion 118 which is formed from the second material provides coverage and privacy when nursing and provides privacy for the baby 104 in the car seat, but also serves as a sun shade or light blocking surface to prevent the baby 104 from being disturbed. The solid band at the perimeter of the second opening 108 along the bottom edge of the multi-use cover 100 that is pulled over the car seat adds weight just as before, but may also include elastic or an additional stretchy element to keep the material of the cover tight and keep it from rolling up at the edge and climbing up on the car seat. For example, the elastic portion at the perimeter of the second opening may be stretched to pull the multi-use cover 100 over the car seat and then contracts to secure against the narrower base of the car seat. FIG. 3 also shows that the fasteners 116 at the perimeter of the first opening 106 at the upper edge of the multi-use cover 100 are secured to keep the multi-use cover 100 from being pulled completely over the car seat and ensures that the car seat handle supports the cover to create a covered region. In some configurations, the fasteners 116 may not need to be secured, but the shape of the cover may be sufficient to keep the multi-use cover 100 from pulling down over the car seat or the car seat handle and leaving the baby 104 uncovered. The design of the multi-use cover 100 ensures that the multi-use cover 100 is supported by the handle of the car seat to prevent it from falling onto the baby 104 within the car seat. In FIG. 3, the mesh of the first portion 110 along the upper edge of the multi-use cover 100, which provides airflow and a private view of the baby 104 when in the nursing configuration still allows airflow to keep the baby 104 from overheating and allows a single private view of the baby 104 for a user 102 to observe the baby 104 as needed. The mesh fabric of the first portion 110, and especially the wider portion 126 provide a view of the baby 104 within the car seat without compromising the effectiveness of the cover portion 118 to block out sunlight. In particular, the width of three to four inches for the wider portion 126 allows the user 102 to view the baby 104 and provides for airflow through the multi-use cover 100 to prevent the baby 104 from overheating within the car seat.

The shape of the multi-use cover 100 allows the multi-use cover to be worn or fitted to a car seat in multiple different orientations for different purposes without sacrificing the functionality. For example, the multi-use cover 100 has a constant height all around the circumference of the multi-use cover 100. This constant height ensures that the multi-use cover can be positioned in the orientation shown in FIG. 3 as well as the orientation shown in FIG. 4 while still maintaining the first opening at the handle of the car seat so it can safely be grasped separate from the multi-use cover 100. The second portion 114 and the perimeter of the second opening 108 fit around the widest middle portion of a car seat to secure the multi-use cover 100 to the car seat in any orientation, including with the cover portion 118 off to one side of the car seat such as the left side or the right side to provide shade from incident sunlight but leave a substantial portion of the car seat covered only by mesh for airflow and visibility purposes.

FIG. 4 shows another orientation or configuration of the multi-use cover 100 in use to cover a car seat. In this orientation or configuration, the second portion 114 including the mesh fabric offers airflow to the baby 104 and sunlight or other light into the baby 104, while also allowing the baby 104 to view the outside world. The second portion 114 also functions to protect the baby 104 from bugs or other annoyances which are excluded from the space within the car seat and underneath the multi-use cover 100 near the baby 104.

FIGS. 5A-5C shows a multi-use cover 200 configured to pack or stow into a bag or pocket 230. Specifically, the multi-use cover 200, shown in a flat configuration, may be folded, rolled, or otherwise put into a storage configuration such that it fits into a pouch or pocket 230 such as shown in FIG. 5C. Other elements, such as the first opening 206, fasteners 116, second opening 208, and first, second, and third portions 210, 214, and 212 may be similar to those described with respect to the multi-use cover 100 above. The pocket 230 may be external to the multi-use cover 200, or may be integrated into the multi-use cover 200 as shown in FIG. 5B. The pocket 230 is shown attached to a narrow part 220 of the third portion such that it will be on the back of the user 102 while the multi-use cover 100 is being used as a nursing cover, putting it out of the way. With the pocket 230 integrated into the multi-use cover 200, the multi-use cover 200 may be folded up and either placed into the pocket 230 or the pocket 230 may be turned inside out, thereby moving the folded or ready to store multi-use cover 200 to the inside of the pocket 230. FIG. 5C may be the cover in a stored configuration within the pocket 230, once again either inside an external and distinct pouch or stored inside a pocket 230 integral to the multi-use cover 100.

FIG. 6 shows the multi-use cover 100 in a scarf configuration worn by a user 102. When worn as a scarf, the user 102 puts their head through the first opening 106 and the second opening 108. FIG. 6 shows that the multi-use cover 100 may be rolled or folded to reduce the width or height of the multi-use cover 100 to make it suitable for a scarf as shown. In some embodiments, the fasteners 116 along the top edge of the cover may be used in this configuration with the fasteners 116 securing the bunched up body of the multi-use cover 100 to keep the multi-use cover 100 confined or contained in a relatively compact bunch, with a cross-section more closely resembling a cylinder.

Figure 7:
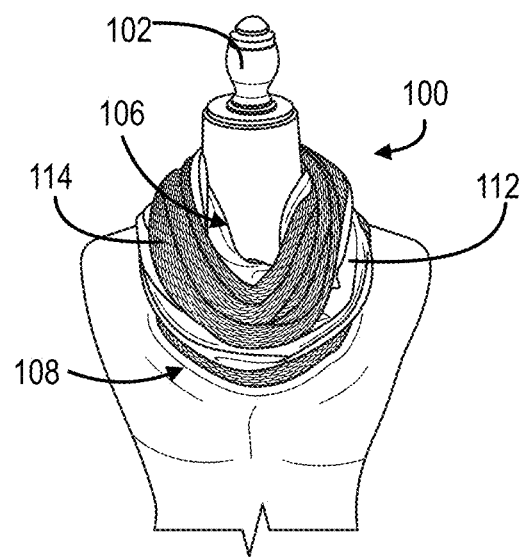
FIG. 7 depicts a multi-use cover shown worn as a scarf with two wraps, according to at least one example.

The multi-use cover 100 may be worn with a single loop around the neck of the user 102, or, as shown in FIG. 7 the multi-use cover 100 may be doubled over to wrap around the neck of the user 102 twice. In some embodiments there may not be any fasteners 116 to keep the multi-use cover 100 gathered together, but it may be worn as a scarf to allow easy access and availability for use as a nursing cover or to cover a car seat or a high chair without having to carry it separately and unpack it for use.

Figure 8C:
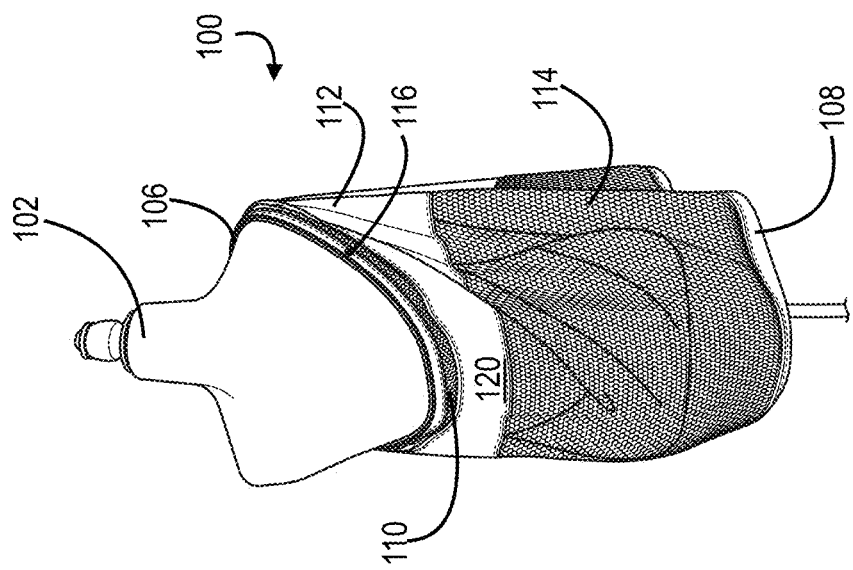
FIGS. 8A-8C depict front, side, and back view of a multi-use cover in a nursing cover configuration without any releasable closures engaged, according to at least one example.
Figure 8B:
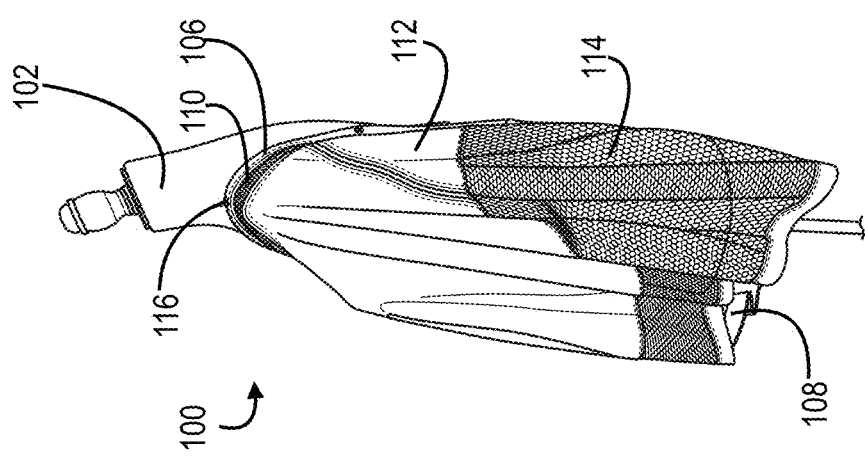
Figure 8A:
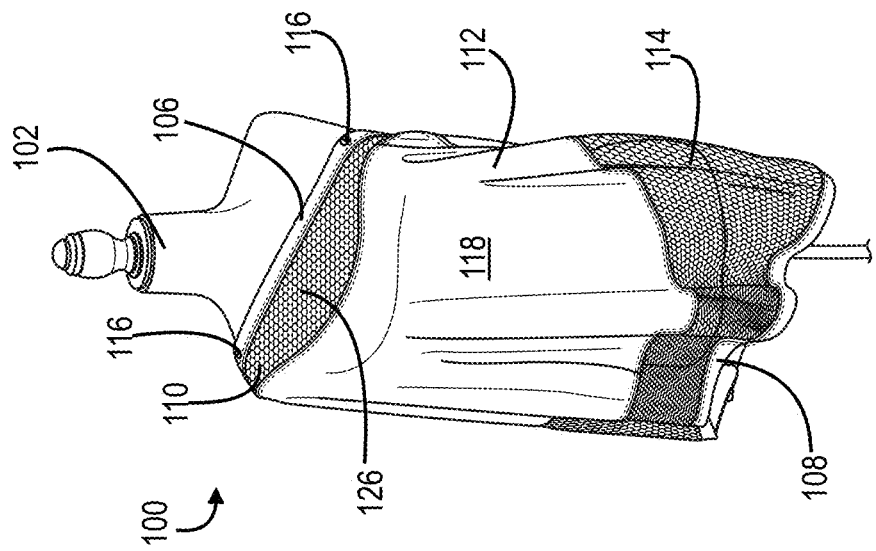

FIGS. 8A-8C show the multi-use cover 100 configured as a nursing cover as shown from a front view (FIG. 8A), a side view (FIG. 8B), and a back or rear view (FIG. 8C). The multi-use cover 100 includes the first portion 110, second portion 114, and third portion 112 as described above including the mesh fabric and the fabric or material which is substantially opaque to provide privacy for nursing. The mesh material of the first portion includes a wider portion 126 allowing airflow and private viewing of a nursing baby 104 while in use. Around the first opening 106 and the second opening 108 are strips of material, which may be the same as the first fabric or material or may differ, which provides weight and durability to the multi-use cover 100. The multi-use cover 100 includes fasteners 116, which could be snaps, buttons, Velcro®, or any other suitable releasable attachment means, though in the configuration shown in FIGS. 8A-8C, the fasteners 116 are not engaged. The fasteners 116 may alternately be engaged to provide for alternate wearing options. It is also worth noting that the multi-use cover 100 may be worn as a regular article of clothing, resembling a poncho sweater or a shawl.

Figure 9A:
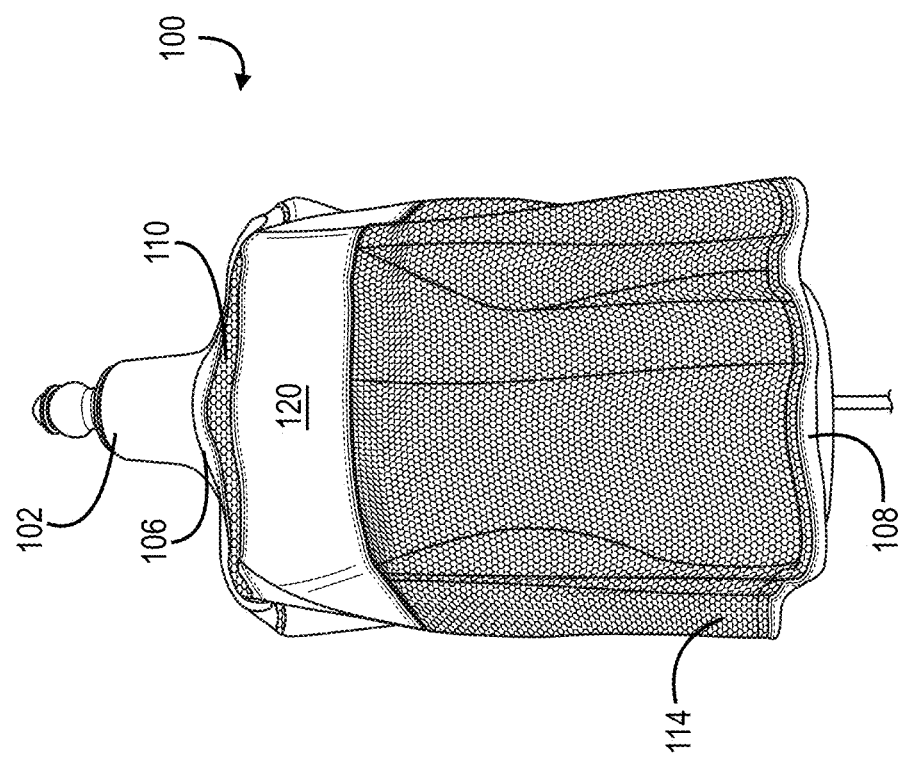
FIGS. 9A-9B depict a multi-use cover worn on the shoulders of a wearer with releasable closures engaged, according to at least one example.
Figure 9B:
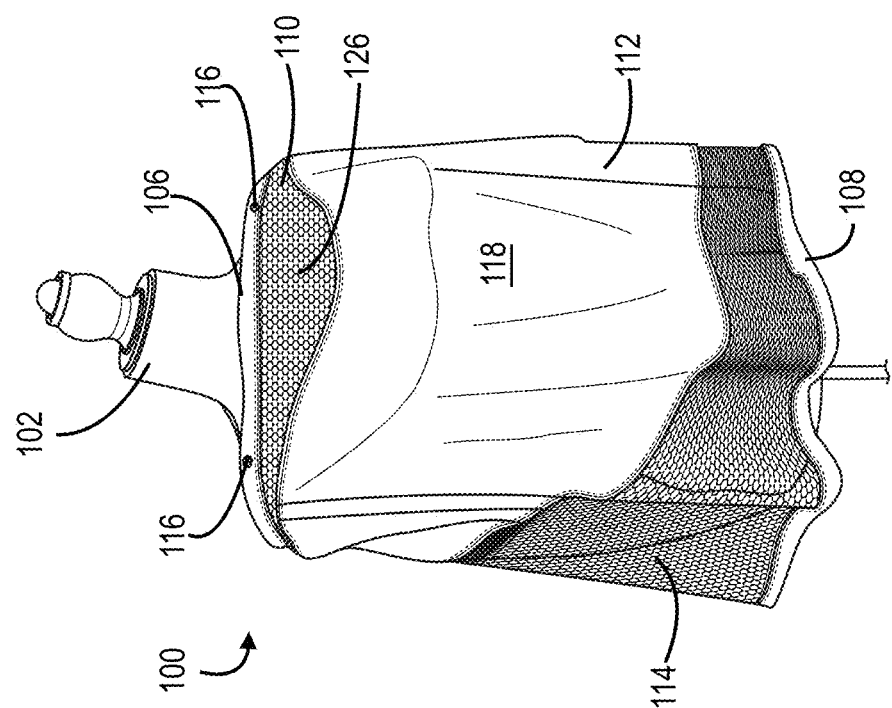

FIGS. 9A-9B show the multi-use cover 100 worn as a nursing cover or shawl/poncho having multiple fasteners 116 around the first opening 106 of the multi-use cover 100 engaged to keep the multi-use cover 100 secured above the shoulders of a user 102 and prevent it from slipping down over the shoulders. The multi-use cover 100 may be worn in this configuration to ensure minimal movement of the cover and continued privacy for nursing. Additionally, for users 102 of varying frame widths, the ability to secure one, both, or none of the fasteners ensures that the cover will remain in place and not slip or slide down the torso of the user 102 regardless of the user's frame size. More fasteners 116 may be added, there may be three, four, five, or even more different fasteners around the upper opening of the cover. Additionally, some embodiments may incorporate a drawstring type closure at the perimeter of the first opening 106 or at the perimeter of the second opening 108. Furthermore, in some configurations, the multi-use cover 100 may include slots or third and fourth openings on the lateral sides of the multi-use cover, such as at the right edge 122 and the left edge 124 of FIG. 2 for the user 102 to pass their arms through rather than being through the first opening 106 or the second opening 108.

Figure 10B:
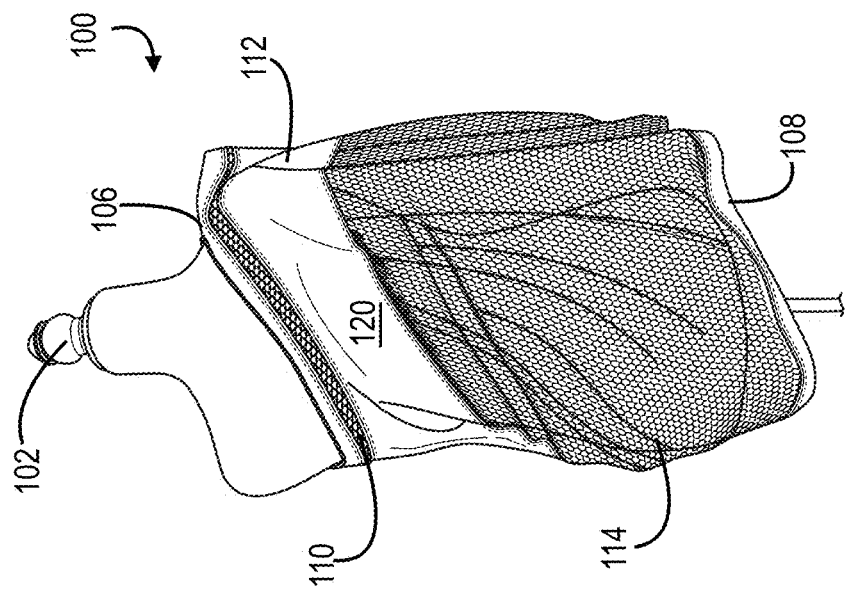
FIGS. 10A-10B depict a front view and a back view of a multi-use cover with a releasable closure engaged and resting on a single shoulder of a wearer, according to at least one example.
Figure 10A:
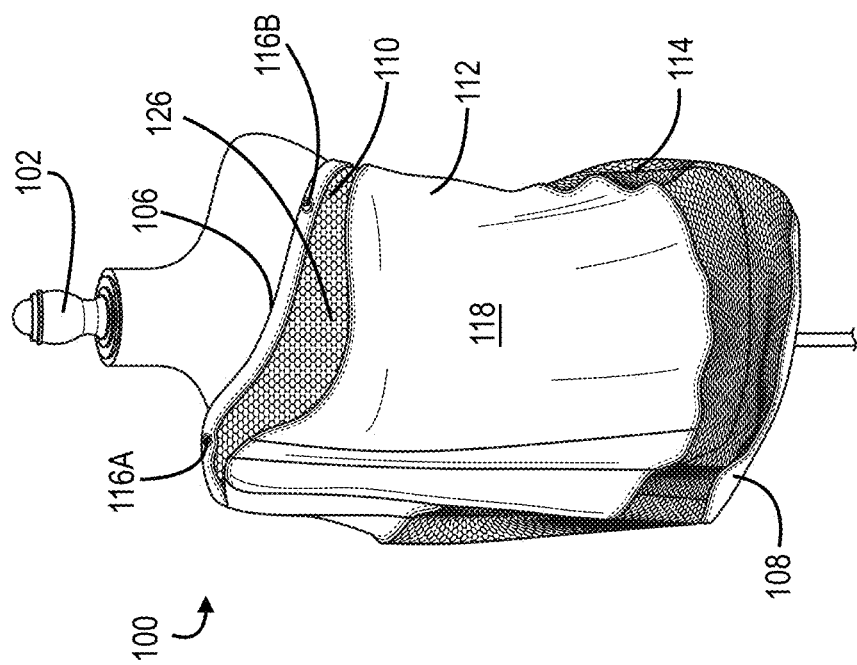

FIGS. 10A-10B show a configuration of the multi-use cover 100 with a single fastener 116, or pair of fasteners 116 secured together into a single fastener 116, secured above the shoulder of the user 102. While there may be additional fasteners 116 around the perimeter of the first opening 106, only one fastener 116 need be secured to keep the multi-use cover 100 up on a shoulder of a user 102. The cover may rest on an upper arm of a user 102 or under the arm of the user 102 on the side of the user 102 opposite the side with the cover resting on the shoulder.

Figure 11B:
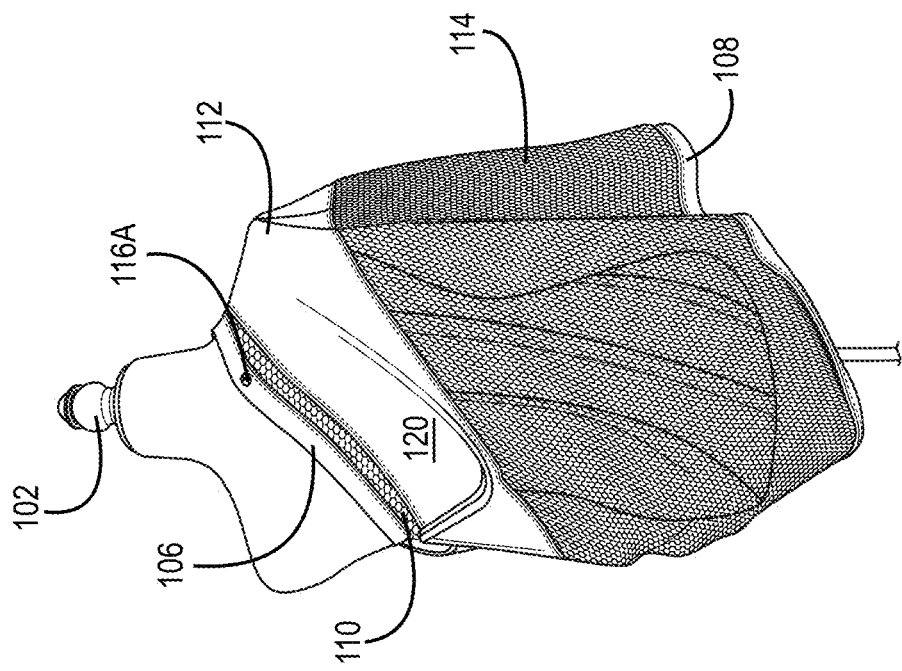
FIGS. 11A-11B depict a front view and a back view of a multi-use cover with a single releasable closure engaged beneath an arm and shoulder of a wearer, according to at least one example.
Figure 11A:
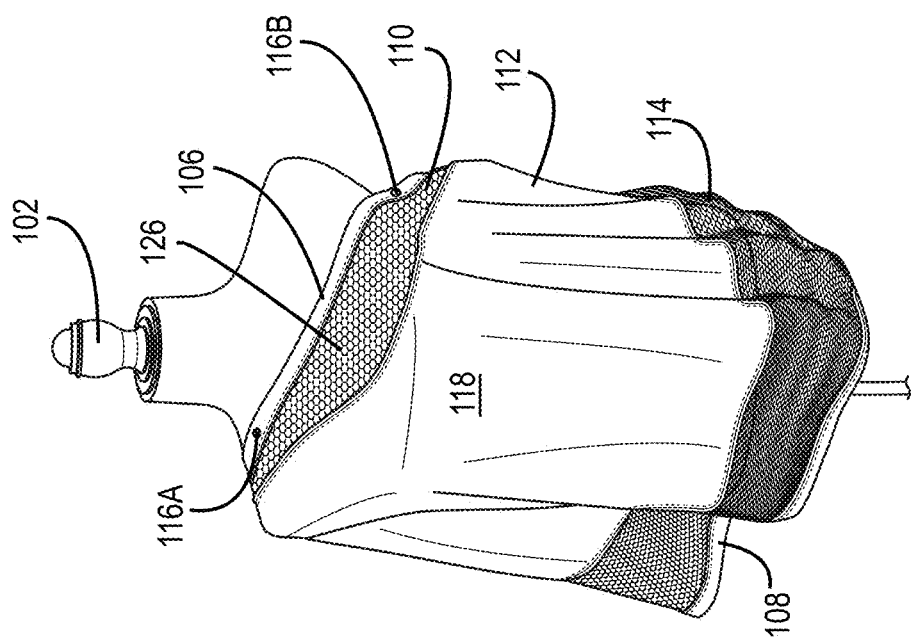

FIGS. 11A-11B show the multi-use cover 100 in another configuration with a front (11A) and rear view (11B). As with other configurations described above, the multi-use cover 100 is pulled over the head of a user 102, with the second opening 108 pulled down over the torso of the user 102. The first opening 106 rests on one shoulder of the user 102 and either on an upper arm or under an arm of the user 102. In the embodiment shown in FIGS. 11A-11B, the first opening 106 is reduced in size by securing a fastener 116 located on or around the edge of the first opening 106. The fastener 116 may be positioned on the upper arm or under the arm of the user 102. In some configurations, there may be multiple fasteners 116 or different styles of fasteners 116 configured to restrict, constrict, or reduce the size of the first opening 106, to prevent the shoulders of the user 102 from passing through the first opening 106 and ensuring privacy.

Figure 12A:
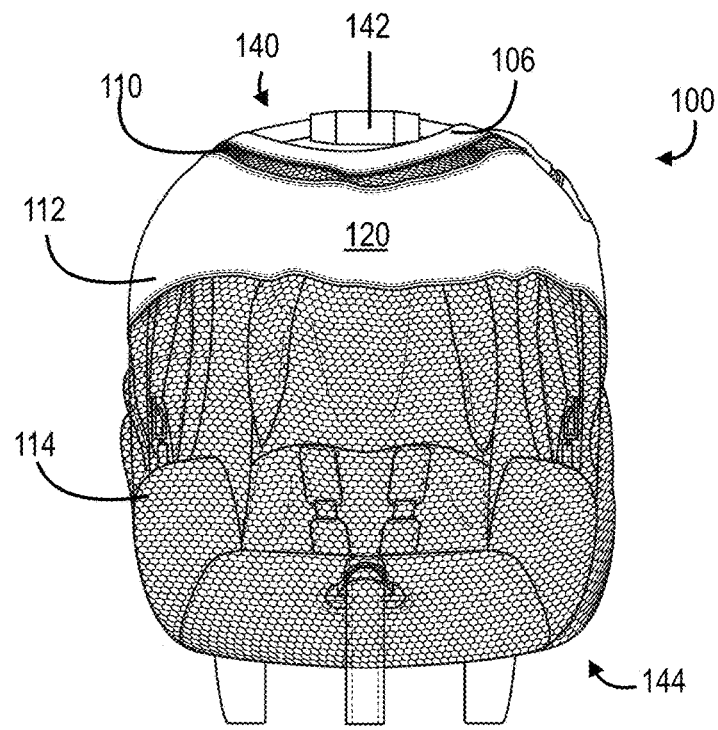
FIGS. 12A-12B depict a front view and a side view of a multi-use cover over an infant car seat with a mesh fabric covering the infant support area, according to at least one example.
Figure 12B:
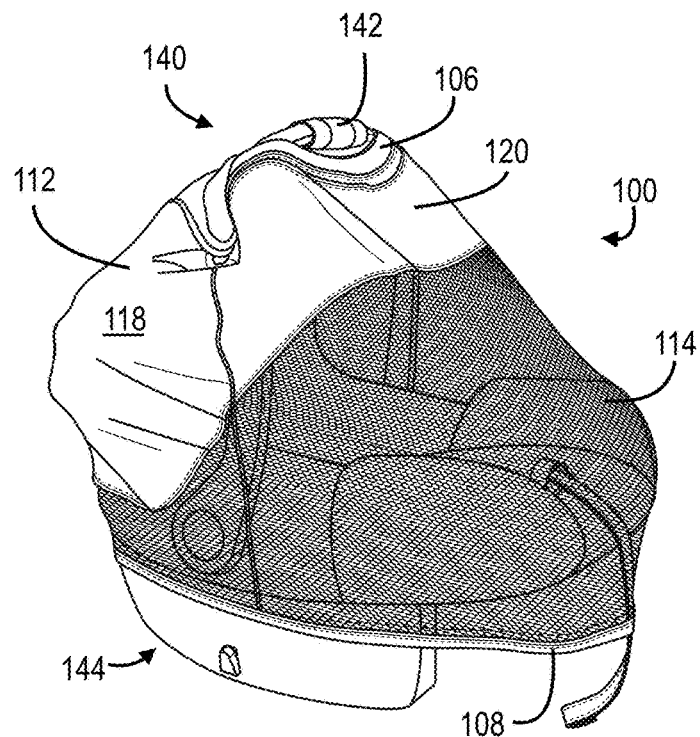

FIGS. 12A-12B show a front (12A) and an isometric (12B) view of a car seat 140 with a multi-use cover 100 pulled over it to cover a baby seating area, the multi-use cover 100 supported by the handle 142 of the car seat to create a tent-like region over the baby seating area. In the configuration shown, the mesh fabric of the second portion 114 is directly in front of and above the baby seating area. The opaque fabric of the third portion 112 is positioned to the rear of the car seat 140. As described above with respect to other embodiments, with the multi-use cover 100 in this orientation, the baby 104 is able to see the surrounding area but is protected from direct full sunlight or from pests and bugs. The multi-use cover 100 may also function to block a substantial amount of wind in this configuration while still allowing the baby 104 to be viewed or see outward. As shown in FIG. 12B, a band around the second opening 108 ensures that the multi-use cover 100 is secured and will not easily pull up or off the car seat 140. FIGS. 12A-12B also show that the first opening 106 of the multi-use cover 100 may be constricted or closed off through the use of several fasteners 116 so the multi-use cover 100 does not slide down the car seat 140 and leave the baby 104 uncovered. Additionally, the first opening 106 is positioned such that the handle 142 is free to be grasped by a user 102 without any fabric interfering with securely grasping the handle 142.

In the configuration shown in FIGS. 12A-12B, the multi-use cover 100 either may not include fasteners 116 around the upper opening, or may have unused fasteners 116 around the first opening 106 to keep the multi-use cover 100 from sliding down the body of the car seat 140 and uncovering the baby 104. Instead, the multi-use cover 100 may have a bell shape or a tapered shape, from a first diameter at the second opening 108 to a smaller second diameter at the first opening 106. In between the first opening 106 and the second opening 108 the body of the multi-use cover 100 may have a number of profiles or shapes. It may increase in size to be larger than the second opening 108 diameter before tapering to the first opening 106 diameter. In some embodiments, the body of the multi-use cover 100 may taper in a linear fashion from the size of the second opening 108 to the size of the first opening 106.

Figure 13A:
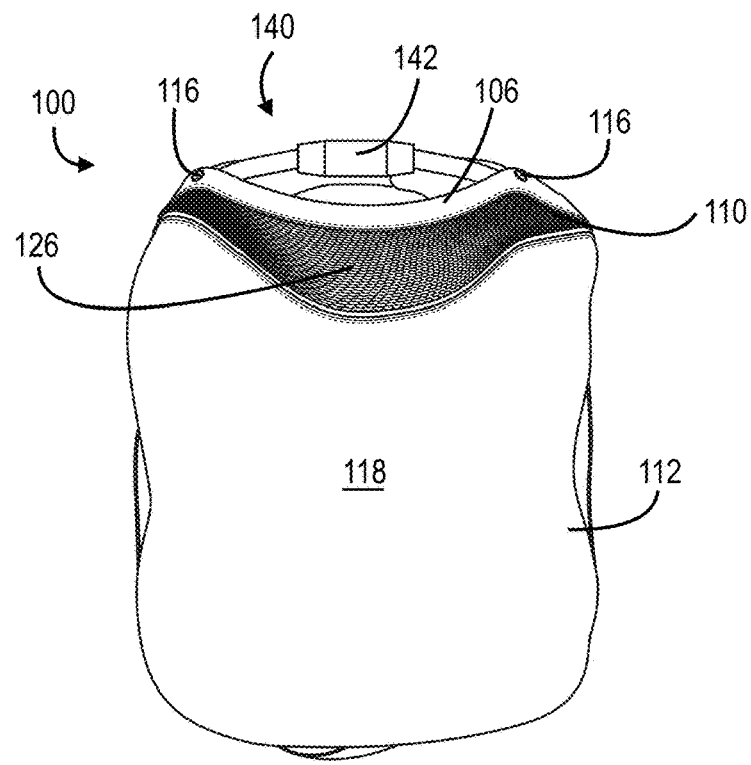
FIGS. 13A-13B depict a front view and a side view of a multi-use cover over an infant car seat with an opaque fabric panel covering the infant support area, according to at least one example.
Figure 13B:
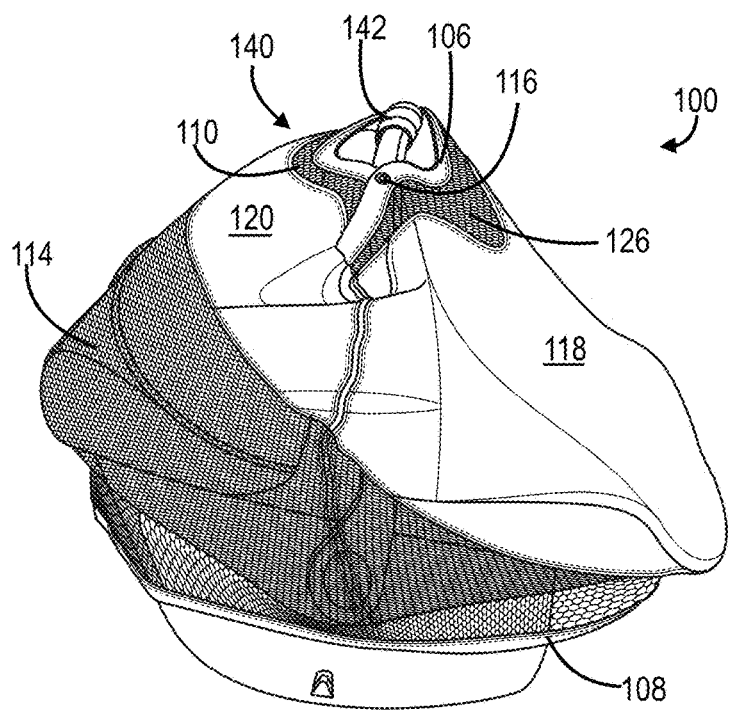

FIGS. 13A-13B show a front and side view of the car seat 140 with the multi-use cover 100 supported over the baby seating area in a shaded configuration. With the opaque material of the third portion 112 and specifically the cover portion 118 directly over the baby seating area, the baby 104 is provided with a sun shade and also with privacy, for instance when sleeping. The support provided by the handle 142 ensures that the sun shade remains above the baby 104 and prevents the material of the multi-use cover 100 from falling on top of the baby 104. The curved area of the first portion 110 near the handle of the baby carrier allows a user 102 to view or check on the baby 104 without removing the cover and still maintaining the sun shade or covering. The mesh of the first portion 110 also allows airflow to the baby 104 to prevent overheating. As shown in FIG. 13B, the multi-use cover 100 is formed of a fabric, such as a jersey knit, that stretches to conform to the shape of the baby car seat and is held in place by friction against the car seat caused by the elasticity of the fabric. Additionally, the lower band around the second opening 108 of the multi-use cover 100 secures the multi-use cover 100 and may keep it securely in place by having an elastic quality or band that reduces the size of the second opening 108 after passing a largest cross section of the car seat 140, near the middle, to secure the multi-use cover 100 in place.

As with other embodiments, the opaque, substantially solid, or tightly woven fabric of the cover portion 118 may be positioned to create a tent-like shape over the baby seating area, or may be on a different region of the car seat 140 with a mesh or open-weave fabric positioned over the baby 104. The multi-use cover 100 may have multiple fasteners 116 to ensure a handle 142 of a baby carrier or car seat 140 supports the body of the multi-use cover 100 above the baby 104 as described with other embodiments herein.

Though pictured with a car seat 140, other configurations or uses are contemplated, including to cover a high chair or baby rocker. Additionally, the multi-use cover 100 may serve to cover a portable sleeping unit such as a bassinet or crib for a baby. In those additional embodiments, the multi-use cover 100 may serve to provide a combination of privacy or shade and air flow or partial visibility as with other embodiments of the disclosure. Additional embodiments also include the use of the multi-use cover 100 as a germ shield or seat cover for a high chair for a child or baby to sit on top of, providing a barrier between the child and the high chair. In those embodiments, the multi-use cover 100 is pulled over the seat of a high chair to cover the seating area and provide a barrier between the baby and an upper surface of the high chair. The fasteners 116 at the first opening 106 opening of the multi-use cover 100 may be fully or partially engaged to create openings for the baby's legs, when the baby 104 is seated on the cover.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A configurable cover for a baby, comprising:
a cover body comprising:
    a first fabric portion defining a first opening, the first fabric portion being generally tubular in shape;
    a second fabric portion defining a second opening, the second fabric portion being generally tubular in shape, wherein the first fabric portion and the second fabric portion define a conduit between the first opening and the second opening; and
    wherein:
        the cover body tapers from the first opening to the second opening; and
        the first fabric portion comprises an opaque material and the second fabric portion comprises a mesh material.

2. The configurable cover for a baby of claim 1, wherein the cover body is configurable in a nursing cover configuration where the first fabric portion rests around a neck and shoulder of a user with the cover body draped over a torso of the user, a seating cover configuration where the first fabric portion is supported by a handle of an infant carrier and the second fabric portion is in contact with a lower surface of the infant carrier such that the cover body covers a substantial portion of the infant carrier, and a wearable configuration where the first fabric portion and the second fabric portion rest around the neck and on the shoulder of the user.

3. The configurable cover for a baby of claim 1, wherein a perimeter of the second opening comprises a plurality of fasteners is configured to adjust the size of the second opening when the fasteners are releasably secured together.

4. The configurable cover for a baby of claim 1, wherein the first fabric portion comprises a second mesh material adjacent the second opening.

5. The configurable cover for a baby of claim 1, further comprising a storage pouch attached to the cover body and configured to store the cover body within the storage pouch.

6. The configurable cover for a baby of claim 1, wherein the first fabric portion comprises a jersey knit or other stretchable fabric.

7. A convertible cover, comprising:
    a first portion comprising a first mesh fabric and defining a first opening to an interior of the convertible cover, the first portion configured to rest on the shoulder of a user, wherein the first fabric portion is generally tubular in shape;
    a second portion comprising a second mesh fabric and defining a second opening to the interior, the second portion at an opposite end of the convertible cover from the first portion, wherein the second fabric portion is generally tubular in shape;
    a third portion comprising a fabric and connecting the first portion and the second portion together to form a body having a passage from the first opening to the second opening; and
    a releasable closure positioned at a perimeter of the first opening to releasably couple to reduce a diameter of the first opening.

8. The convertible cover of claim 7, wherein the releasable closure comprises a snap fastener comprising two portions which couple together, with each of the two portions positioned on the perimeter of the first opening.

9. The convertible cover of claim 7, wherein:
    the first portion, second portion, and third portion define a cover body; and
    the cover body tapers from a smaller first dimension at the first opening to a larger second dimension at the second opening.

10. The convertible cover of claim 7, further comprising an elastic member positioned at the perimeter of the second opening and configured to allow the perimeter of the second opening to increase when the elastic member is stretched.

11. The convertible cover of claim 7, wherein:
    the third portion has a first dimension on a first lateral side of the convertible cover and a second dimension on a second lateral side of the convertible cover, the first dimension greater than the second; and
    a length of the convertible cover is constant on both the first lateral side and the second lateral side.

12. The convertible cover of claim 7, further comprising a storage pouch attached to the convertible cover, the storage pouch configured to store the convertible cover within an inner volume of the storage pouch.

13. The convertible cover of claim 7, wherein the first mesh fabric and the second mesh fabric are breathable and transparent.

14. The convertible cover of claim 7, wherein the fabric is opaque.

15. A convertible cover, comprising:
a cover body comprising:
- a first portion comprising a first mesh fabric and defining a first opening to an interior of the convertible cover;
- a second portion comprising a second mesh fabric and defining a second opening to the interior;
- a third portion comprising a fabric and connecting the first portion and the second portion together to form a body having a passage from the first opening to the second opening; and
- wherein the second portion has narrow portion having a first width and a wide portion having a second width, the second width greater than the first width, wherein the narrow portion and the wide portion oppose one another;

a releasable closure positioned at a perimeter of the first opening to releasably couple to reduce a diameter of the first opening; and wherein the cover body tapers from a first dimension at the first opening to a second dimension at the second opening, the second dimension greater than the first dimension.

16. The convertible cover of claim 15, further comprising an elastic member positioned on a perimeter of the second opening.

17. The convertible cover of claim 15, wherein:
the first mesh fabric and the second mesh fabric are transparent; and the fabric is opaque.

18. The convertible cover of claim 15, wherein the releasable closure comprises two snap releases, each snap release comprising a snap and a receiver positioned at the perimeter of the first opening.

19. The convertible cover of claim 15, wherein the convertible cover is configurable in at least:
- a nursing cover configuration wherein a head and a neck of a user are positioned through the first opening, the releasable closure configured to reduce the size of the first opening to prevent shoulders of the user to pass through the first opening, the cover body draped over a torso of the user, and the third portion positioned to provide an opaque nursing cover for the user;
- a seating cover configuration, wherein the releasable closure is closed and the cover body is supported by a handle of an infant seat with the cover body covering the infant seat; and
- a wearable configuration wherein the first opening and the second opening are both around the neck of the user.

20. The convertible cover of claim 15, further comprising a storage pouch integral to the cover body and configured to store the cover body within an inner volume of the storage pouch.

* * * * *